(12) United States Patent
Aoki

(10) Patent No.: US 7,828,028 B2
(45) Date of Patent: Nov. 9, 2010

(54) PNEUMATIC TIRE FOR TWO-WHEELED VEHICLE

(75) Inventor: Shinji Aoki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 809 days.

(21) Appl. No.: 10/585,304

(22) PCT Filed: Jan. 7, 2005

(86) PCT No.: PCT/JP2005/000126

§ 371 (c)(1),
(2), (4) Date: Jun. 22, 2007

(87) PCT Pub. No.: WO2005/065970

PCT Pub. Date: Jul. 21, 2005

(65) Prior Publication Data

US 2008/0190536 A1   Aug. 14, 2008

(30) Foreign Application Priority Data

Jan. 7, 2004   (JP) .............................. 2004-002280

(51) Int. Cl.
*B60C 9/00* (2006.01)
*B60C 9/06* (2006.01)
*B60C 9/18* (2006.01)
*B60C 9/28* (2006.01)

(52) U.S. Cl. ...................... 152/526; 152/535; 152/538; 152/559

(58) Field of Classification Search .................. 152/538
See application file for complete search history.

(56) References Cited

U.S. PATENT DOCUMENTS 2,493,614 A * 1/1950 Bourdon ..................... 152/534
2,884,040 A * 4/1959 Saint-Frison et al. ........ 152/527

(Continued)

FOREIGN PATENT DOCUMENTS

JP   62-261504   * 11/1987

(Continued)

*Primary Examiner*—Justin R. Fischer
(74) *Attorney, Agent, or Firm*—Sughrue Mion, PLLC

(57) ABSTRACT

Providing a pneumatic tire for two-wheeled vehicle which is capable of enhancing the braking performance and the high-speed turning performance, while assuring the ride comfort.

The carcass has a semi-radial construction, whereby the necessary and minimum rigidity is ensured with the ride comfort being assured. In the crown part of the semi-radial bias carcass 16, a belt layer 26, which is a crossed belt layer, is provided, and inside of the tread end parts, a radial reinforcement band layer 22 in which a plurality of reinforcement cords 24 extending in the radial direction are arranged is provided. By disposing the radial reinforcement band layer 22, the section flexural rigidity (the flexural rigidity in the tire width direction) for the crown part is improved, and further the reinforcement cords 24 in the radial reinforcement band layer 22 restricts the pantograph (the rhombus) made up of the reinforcement cords 11 of the two carcass plies from being extended in the radial direction, which provides a great reinforcement effect. The cornerability at the time of banking depends particularly on the ground contactability for the tread end part, and in the present invention, no radial reinforcement band layer is added to the tread end part with priority being given to the ground contactability and the section flexural rigidity therefor being not increased, thus a high turning performance can be obtained.

6 Claims, 3 Drawing Sheets

U.S. PATENT DOCUMENTS 2,947,339 A * 8/1960 Billingsley .................. 152/533
6,588,472 B2 * 7/2003 Pirotte ..................... 152/209.8

FOREIGN PATENT DOCUMENTS

| JP | 2-74403 | * | 3/1990 |
| JP | 5-4503 A | | 1/1993 |
| JP | 8-25910 A | | 1/1996 |
| JP | 10-44712 | * | 2/1998 |
| JP | 11-245616 A | | 9/1999 |
| JP | 2003-252007 A | | 9/2003 |

* cited by examiner

PNEUMATIC TIRE FOR TWO-WHEELED VEHICLE

TECHNICAL FIELD

The present invention pertains to a pneumatic tire for a two-wheeled vehicle, and particularly relates to a pneumatic tire for a two-wheeled vehicle that is capable of enhancing the braking performance and the high-speed turning performance, and is well suited for high-performance automatic two-wheeled vehicles.

BACKGROUND ART

Conventionally, as a tire which turning performance has been improved, the pneumatic tire for two-wheeled vehicle as disclosed in the patent literature 1, for example, is available.

The construction of this tire provides the tread surface with a rigidity required for accommodating the cornering power at the time of big bank running, and in order to maintain the flexibility for flattening the grounding surface tread to improve the force to grip the road surface, disposes an auxiliary breaker made up of nylon cords arranged substantially in the radial direction between the aromatic polyamide crossed breaker and the carcass made up of nylon cords arranged in the radial direction.

Patent Document: Japanese Patent No. 2916080

DISCLOSURE OF THE INVENTION

Problems to be Solved by the Invention

By the way, in recent years, in order to cope with the vehicle being provided with a higher speed performance and a higher output performance, the braking power has been enhanced.

Thus, in addition to the conventional demand for more lightweight tires, there has arisen a demand for tires with a higher rigidity, which is contradictory to a demand for reduction in weight.

Conventionally, as techniques for increasing the tire rigidity, the following ones, and the like, have been proposed.

(a) Rendering the carcass construction semi-radial, and providing the carcass with a lamination (plural number carcass layer), or subjecting it to a treatment for increased elasticity.
(b) Providing the belt layer with further lamination, or subjecting it to a treatment for higher elasticity.
(c) Providing both the carcass and the belt layer with a lamination, and subjecting them to a treatment for higher elasticity.

On the market, not only enhancing the rigidity is demanded, but also bettering the ride comfort is further requested, the rigidity, the ride comfort, and the high-speed turnability being thus requested to coexist, however, with the above-mentioned conventional techniques, it has been difficult to render the rigidity, the ride comfort, and the high-speed turnability coexistent.

For example, with the technique as mentioned in (a) above, merely rendering the carcass construction semi-radial is insufficient for giving the feeling of rigidity, although the ride comfort can be maintained thereby, and providing the carcass with a lamination can maintain the feeling of rigidity, but increases the flexural rigidity in the tread and side areas, thus the ride comfort is reduced, and the ground contactability at the time of banking is lowered, leading to the cornering grip being diminished.

With the technique as mentioned in (b) above, providing the belt layer with an excessive lamination promotes the shearing direction displacement between belt layers, thus not only a sufficient grounding surface shearing rigidity cannot be assured, but also the ground contactability is reduced, giving an insufficient grip, and thus the cornering force (required for the high-speed turnability) cannot be assured.

In addition, with the technique as mentioned in (c) above, mere assurance of the rigidity is possible, but as described above, multiplication of the respective disadvantages results in the ride comfort being degraded, and the grip and cornering force being lowered due to the reduction in ground contactability.

The present invention has been made to solve the above-mentioned problems, and the purpose thereof is to provide a pneumatic tire for two-wheeled vehicle that can enhance the braking performance and the high-speed turning performance, while assuring the ride comfort.

Means to Solve the Problems

In order to achieve the above-mentioned purpose, the pneumatic tire for a two-wheeled vehicle of claim 1 provides a pneumatic tire for a two-wheeled vehicle, comprising: bead cores embedded in a right and left pair of bead parts; a semi-radial bias carcass layer which extends from one bead part to the other bead part in the shape of a toroid, end portions of which are rolled up around the bead cores to be latched at the bead cores; a radial reinforcement band layer which is disposed only at an inner side of tread ends in a tire width direction, and is disposed at a tire radial direction outer side of a crown part of the semi-radial bias carcass layer, comprising at least one ply at which a plurality of reinforcement cords extending in a radial direction are arranged; a belt layer which is disposed at an outer side of the radial reinforcement band layer in the tire radial direction, comprising at least one belt ply at which a plurality of reinforcement cords are arranged; and a tread layer which is disposed at an outer side of the belt layer in the tire radial direction, wherein, in the semi-radial bias carcass layer, at least two carcass plies in which a plurality of reinforcement cords extending in a direction of 50 deg to 80 deg with respect to a tire equatorial plane are arranged are provided such that the reinforcement cords of the respective carcass plies are crossed with each other, and assuming that the absolute value of the total sum of rigidity components in a circumferential direction of the belt layer is $|\Sigma Fb|$ and the absolute value of the total sum of rigidity components in a width direction of a case made up of the semi-radial bias carcass layer and the radial reinforcement band layer is $|\Sigma Fc|$, $|\Sigma Fb|/|\Sigma Fc|=1.3$ to $3.0$ in a case in which the reinforcement cord constituting the belt layer is a textile cord, and $|\Sigma Fb|/|\Sigma Fc|=0.03$ to $0.1$ in a case in which the reinforcement cord constituting the belt layer is a steel cord, provided that $|\Sigma Fb|=Mbi \times Nbi \times \cos(\alpha bi) \times$ number of belt layers (i) where Mbi: the initial modulus of elasticity at 0.5% elongation for the reinforcement cord constituting the respective belt layers (the unit is cN/dtex for the textile cord, and is $kN/mm^2$ for the steel cord), Nbi: end count (cords/cm) for the reinforcement cord constituting the respective belt layers, $\alpha bi$: inclination angle (deg) with respect to the circumferential direction for the reinforcement cord constituting the respective belt layers and $|\Sigma Fc|=[Mpi \times Npi \times \sin(\alpha pi) \times$ number of the carcass plies$]+[Msi \times Nsi \times \sin(\alpha si) \times$ number of the radial reinforcement band layers], where Mpi: the initial modulus of elasticity (cN/dtex) at 0.5% elongation for the reinforcement cord constituting the carcass ply, Msi: the initial modulus of elasticity (cN/dtex) at 0.5% elongation for the reinforcement cord constituting the radial reinforcement band layer, Npi: end count (cords/cm) for the reinforcement cord constituting the carcass ply, Nsi: end count (cords/cm) for the reinforcement cord constituting the radial reinforcement band layer, αpi: inclination angle (deg) with respect to the circumferential direction for the reinforcement cord constituting the carcass ply, αsi: inclination angle (deg) with respect to the circumferential direction for the reinforcement cord constituting the radial reinforcement band layer.

Next, the operation of the pneumatic tire for two-wheeled vehicle of claim 1 will be described.

In the present invention, the pneumatic tire for two-wheeled vehicle is contemplated by dividing it into two areas, i.e., the area for assuring the rigidity and that for assuring the ground contactability, when viewed from the section along the rotation axis of the tire, in order to render the feeling of rigidity and the cornering characteristics coexistent.

a) It is desired that the rigidity be assured in the side part, but excessively increasing the section flexural rigidity (depending on the lamination material) deteriorates the ride comfort. In the present invention, at the side part, by providing the carcass construction with a semi-radial feature (which provides an intermediate characteristic between the radial and biased constructions) it assures the necessary and minimum rigidity for the side part with the ride comfort being ensured.

b) The cornerability at the time of banking depends particularly on the ground contactability for the tread end part, and in the present invention, any radial reinforcement band layer in which a plurality of reinforcement cords extending in the radial direction are arranged is not added to the tread end part, with priority being given to the ground contactability, and the section flexural rigidity therefor being not increased.

c) Addition of the reinforcement layer to the treading surface of the tread provides the greatest effect in assuring the rigidity in the present case. The reinforcing material is disposed in the area where the ground contactability for the tread end part is not impaired, and where the lamination effect is the greatest in the vicinity of the center of the width of the treading surface of the tread.

In the present invention, in the crown part of the carcass, a radial reinforcement band layer in which a plurality of reinforcement cords extending in the radial direction are arranged is disposed, thus, the section flexural rigidity (the flexural rigidity in the tire width direction) for the crown part is improved, and further the reinforcement cords in the radial reinforcement band layer restricts the pantograph (the rhombus) made up of the reinforcement cords in the two carcass plies from being extended in the radial direction, which provides a great reinforcement effect.

In the present invention, the concepts as described in a), b), and c) above allow the necessary and sufficient rigidity to be realized, and the cornering characteristics (the cornering force and grip) to be maintained in coexistence with the rigidity.

Herein, in case the reinforcement cord constituting the belt layer is a textile cord, if the ratio of $|\Sigma Fb|/|\Sigma Fc|$, i.e., the ratio of the absolute value of the total sum of the rigidity components in the circumferential direction for the belt layer, $|\Sigma Fb|$, to the absolute value of the total sum of the rigidity components in the width direction for the casing made up of the semi-radial bias carcass and the radial reinforcement band layer, $|\Sigma Fc|$, is lowered to be under 1.3, the ride comfort gets worse.

In addition, in case the reinforcement cord constituting the belt layer is a textile cord, if the ratio $|\Sigma Fb|/|\Sigma Fc|$ exceeds 3.0, the ground contactability is impaired, which leads to the cornering characteristics being deteriorated.

Therefore, in the present invention, in case the reinforcement cord constituting the belt layer is a textile cord, it is required that the ratio $|\Sigma Fb|/|\Sigma Fc|=1.3$ to 3.0 be satisfied.

On the other hand, in case the reinforcement cord constituting the belt layer is a steel cord, if the ratio of $|\Sigma Fb|/|\Sigma Fc|$, i.e., the ratio of the absolute value of the total sum of the rigidity components in the circumferential direction for the belt layer, $|\Sigma Fb|$, to the absolute value of the total sum of the rigidity components in the width direction for the casing made up of the semi-radial bias carcass and the radial reinforcement band layer, $|\Sigma Fc|$, is lowered to be under 0.03, the chattering is caused, and the ride comfort gets worse.

In addition, in case the reinforcement cord constituting the belt layer is a steel cord, if the value of the ratio $|\Sigma Fb|/|\Sigma Fc|$ exceeds 0.1, the ground contactability is impaired, resulting in the grip and cornering characteristics being degraded.

Therefore, in the present invention, in case the reinforcement cord constituting the belt layer is a steel cord, it is required that the equation $|\Sigma Fb|/|\Sigma Fc|=0.03$ to 0.1 be satisfied.

The invention of claim 2 provides the pneumatic tire for two-wheeled vehicle of claim 1, wherein the reinforcement cord in the carcass layer has an initial modulus of elasticity, Mpi, of 29 to 56 cN/dtex; an inclination angle, αp, of 50 to 80 deg with respect to the circumferential direction; and a thread count, Np, of 5 to 13 threads/cm, the reinforcement cord in the radial reinforcement band layer has an initial modulus of elasticity, Ms, of 50 cN/dtex or over; an inclination angle, αs, of 80 to 90 deg with respect to the circumferential direction; and a thread count, Ns, of 8 to 13 threads/cm, and the reinforcement cord in the belt layer is a textile cord having an initial modulus of elasticity, Mb, of 150 cN/dtex or over, or a steel cord having an initial modulus of elasticity, Mb, of 8 kN/mm² or over; and has an inclination angle, αb, of 0 to 30 deg with respect to the circumferential direction; and a thread count, Nb, of 8 to 13 threads/cm.

Next, the operation of the pneumatic tire for two-wheeled vehicle of claim 2 will be described.

By providing the configuration of claim 2, the rigidity can be assured without the ground contactability being impaired.

If the initial modulus of elasticity, Mpi, for the reinforcement cord in the carcass layer is under 29 cN/dtex, the rigidity and strength necessary for the tire cannot basically be maintained.

If the initial modulus of elasticity, Mpi, for the reinforcement cord in the carcass layer exceeds 56 cN/dtex, the rigidity is excessively increased, resulting in the ride comfort getting worse.

If the inclination angle, αp, with respect to the circumferential direction for the reinforcement cord in the carcass layer is under 50 deg, a biased construction will be produced.

If the inclination angle, αp, with respect to the circumferential direction for the reinforcement cord in the carcass layer exceeds 80 deg, an insufficient effect of binding band will be given.

If the end count, Np, for the reinforcement cord in the carcass layer is under 5/cm, the basic rigidity for the tire cannot be maintained.

If the end count, Np, for the reinforcement cord in the carcass layer exceeds 13/cm, the rigidity is excessively increased, resulting in the ride comfort getting worse.

If the initial modulus of elasticity, Ms, for the reinforcement cord in the radial reinforcement band layer is under 50 cN/dtex, the rigidity necessary for the reinforcement band cannot be provided.

If the inclination angle, αs, with respect to the circumferential direction for the reinforcement cord in the radial reinforcement band layer is under 80 deg, a difference between the right and left tires is produced, which can affect the uniformity, and the like.

If the end count, Ns, for the reinforcement cord in the radial reinforcement band layer is under 8/cm, the rigidity necessary for the reinforcement band cannot be provided.

If the end count, Ns, for the reinforcement cord in the radial reinforcement band layer exceeds 13/cm, both the ride comfort and the ground contactability get worse.

In case the reinforcement cord in the belt layer is a textile cord, if the initial modulus of elasticity, Mb, is under 150 cN/dtex, the requirements of the belt layer for geometry and effect of binding band cannot be met.

In case the reinforcement cord in the belt layer is a steel cord, if the initial modulus of elasticity, Mb, is under 8 cN/dtex, the requirement of the steel cord for feeling of rigidity cannot be met.

If the inclination angle, αb, with respect to the circumferential direction for the reinforcement cord in the belt layer exceeds 30 deg, the requirements of the belt layer for geometry and effect of binding band cannot be met.

If the end count, Nb, for the reinforcement cord in the belt layer is under 8/cm, the requirements of the belt layer for geometry and effect of binding band cannot be met.

If the end count, Nb, for the reinforcement cord in the belt layer exceeds 13/cm, the ground contactability is diminished, resulting in the cornering characteristics being deteriorated.

The invention of claim 3 provides the pneumatic tire for two-wheeled vehicle of claim 1 or 2, wherein the reinforcement cord in the radial reinforcement band layer has at least an elasticity higher than that for the reinforcement cord in the carcass layer.

Next, the operation of the pneumatic tire for two-wheeled vehicle of claim 3 will be described.

If the modulus of elasticity for the reinforcement cord in the radial reinforcement band layer is lower than that for the reinforcement cord in the carcass layer, the effect of suppressing the deformation of the pantograph structured with the reinforcement cords in the carcass layer will be insufficient, which renders providing the radial reinforcement band layer meaningless.

The invention of claim 4 provides the pneumatic tire for two-wheeled vehicle of any one of claims 1 to 3, wherein the width of the radial reinforcement band layer is 50 to 90% of the tread periphery width measured along the surface of the tread.

Next, the operation of the pneumatic tire for two-wheeled vehicle of claim 4 will be described.

If the width of the radial reinforcement band layer exceeds 90% of the tread periphery width measured along the surface of the tread (in the direction orthogonal to the tire equatorial plane), the section flexural rigidity is excessively increased, resulting in the tread ground contactability being too much lowered, and especially at the time of banking, degradation in ground contactability renders it impossible to assure the cornering force and the cornering grip.

In addition, if the radial reinforcement band layer is laminated to the sidewall, the spring constant is too much increased, resulting in the ride comfort getting worse.

On the other hand, if the width of the radial reinforcement band layer is lowered to be under 50% of the tread periphery width measured along the surface of the tread, the effect of providing the radial reinforcement band layer will be difficult to be obtained.

The invention of claim 5 provides the pneumatic tire for two-wheeled vehicle of any one of claims 1 to 4, wherein the reinforcement cord in the carcass layer is a nylon cord, the reinforcement cord in the belt layer is an aromatic polyamide cord, and the reinforcement cord in the radial reinforcement band layer is a rayon cord.

Next, the operation of the pneumatic tire for two-wheeled vehicle of claim 5 will be described.

First, the reinforcement cord in the carcass layer is specified to be a nylon cord, thus the strength per weight is high as compared to a case of rayon, which allows the rigidity requirement for the carcass layer to be met with the smallest number of plies. In addition, the fatigue resistance required for the carcass is excellent.

In addition, the reinforcement cord in the belt layer is specified to be an aromatic polyamide cord, thus the strength per weight is double as high as a case of a nylon, and the modulus of elasticity therefor is eight times as high, thus the belt is optimum as a belt layer, which requires the effect of binding band most of all.

In addition, the reinforcement cord in the radial reinforcement band layer is specified to be a rayon cord, thus the modulus of elasticity is high, which provides the effect of suppressing the tire dimensional growth due to the running, and thus it is optimum as a reinforcing material.

The invention of claim 6 provides the pneumatic tire for two-wheeled vehicle of any one of claims 1 to 4, wherein the reinforcement cord in the carcass layer is a nylon cord, the reinforcement cord in the belt layer is a steel cord, and the belt layer is a spiral belt layer which is formed by spirally rolling up the steel cord, and the radial reinforcement band layer is of a single layer, and the reinforcement cord is an aromatic polyamide cord.

Next, the operation of the pneumatic tire for two-wheeled vehicle of claim 6 will be described.

First, the reinforcement cord in the carcass layer is specified to be a nylon cord, thus the strength per weight is high as compared to a case of a rayon, which allows the rigidity requirement to be met with the smallest number of plies. In addition, the fatigue resistance required for the carcass is excellent.

The belt layer is a spiral belt layer which is formed by spirally rolling up the steel cord, whereby a greater effect of binding band is provided, and the high-speed durability is improved as compared to that for the bias belt layer.

Further, the radial reinforcement band layer is specified to be of a single layer, and the reinforcement cord therefor is to be an aromatic polyamide cord, which allows lightweighting.

EFFECT OF THE INVENTION

As described above, the pneumatic tire for two-wheeled vehicle of the present invention is provided with the above-mentioned configuration, thus an excellent effect that the braking performance and the high-speed turning performance can be enhanced, while the ride comfort being assured is provided.

BEST MODE FOR CARRYING OUT THE INVENTION

First Embodiment

Hereinbelow, a pneumatic tire for two-wheeled vehicle 10 pertaining to a first embodiment of the present invention will be described with reference to the drawings.

Figure 1:
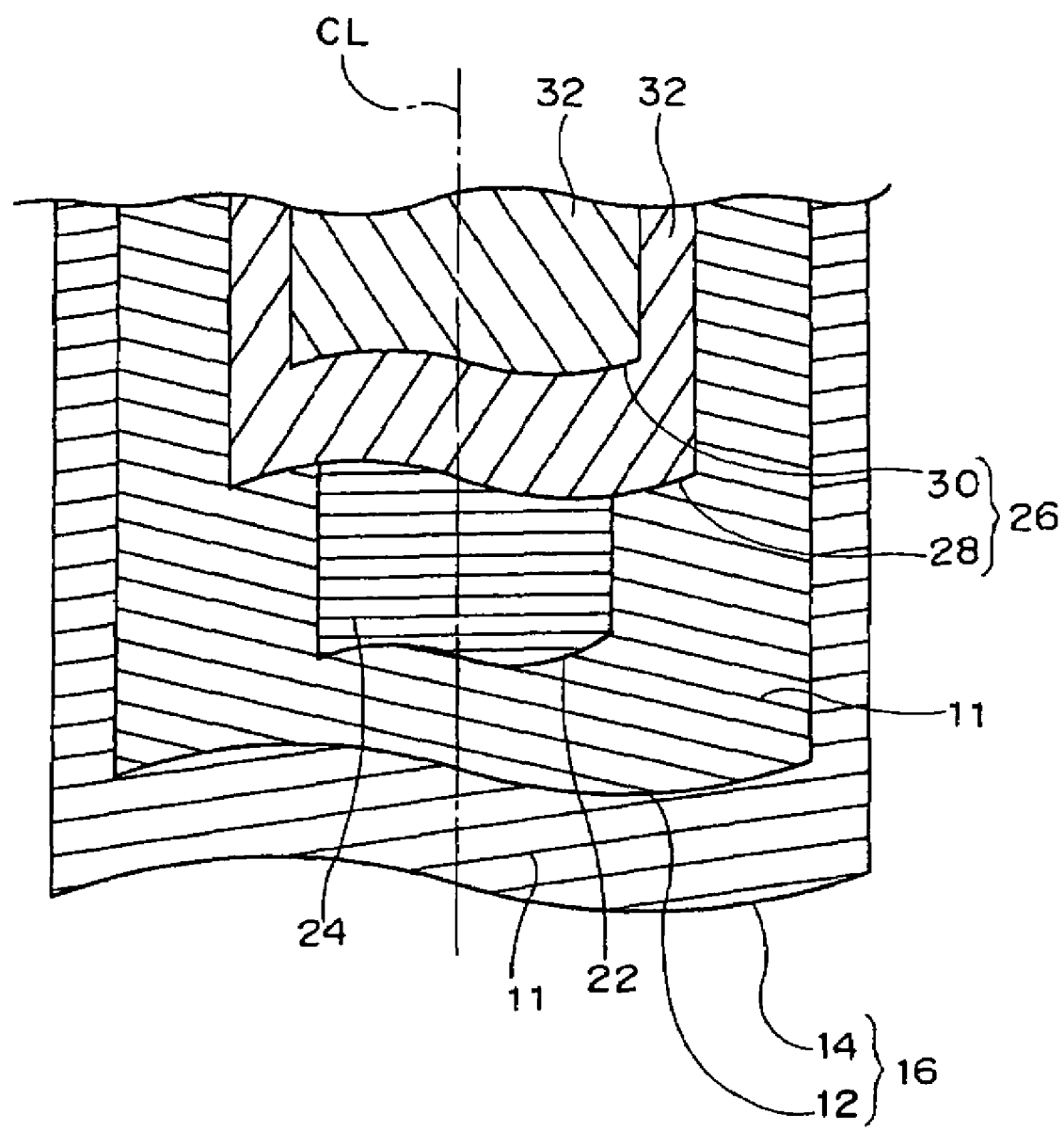
FIG. 1 is a plan development of the carcass layer, the radial reinforcement band layer, and the belt layer of a pneumatic tire for two-wheeled vehicle pertaining to a first embodiment.
Figure 2:
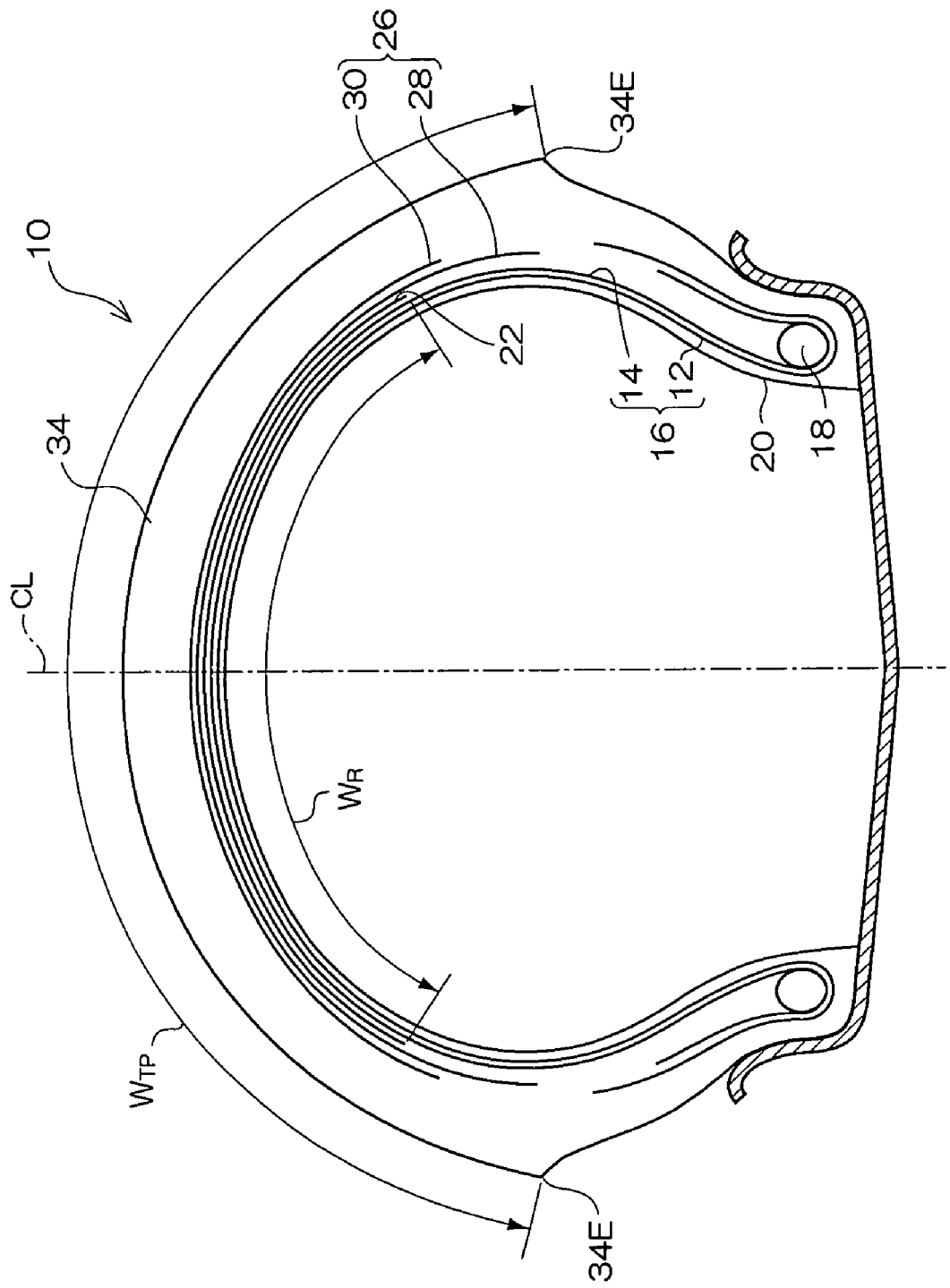
FIG. 2 is a sectional view along the rotation axis of the pneumatic tire for two-wheeled vehicle pertaining to the first embodiment.

The pneumatic tire for two-wheeled vehicle 10 of the present embodiment is for use with a front wheel which tire size is specified to be 120/600 R17, and as shown in FIG. 1 and FIG. 2, comprises a semi-radial bias carcass 16 constituted by a first carcass ply 12 and a second carcass ply 14 in which reinforcement cords 11 extending in the direction crossing the tire equatorial plane CL are embedded.

(Semi-Radial Bias Carcass)

Both end portions of the first carcass ply 12 and the second carcass ply 14 are rolled up from the inside of the tire toward the outside, respectively, around a bead core 20 embedded in a bead part 18.

In these first carcass ply 12 and second carcass ply 14, a plurality of reinforcement cords 11 are arranged in parallel with one another and rubber-coated, respectively.

As the reinforcement cord 11, a textile cord (an organic fiber cord) made of such a material as aliphatic polyamide (nylon), PEN, PET, rayon, or the like, is preferable, however, any other material may be used.

In the present embodiment, as the reinforcement cord 11, a nylon cord is used, and the initial modulus of elasticity therefor is 31 cN/dtex.

The reinforcement cord 11 in the first carcass ply 12 and the reinforcement cord 11 in the second carcass ply 14 are crossed with each other, and are inclined in the directions opposite to each other with respect to the tire equatorial plane CL.

In order to provide a semi-radial construction, it is preferable that the inclination angle for the reinforcement cord 11 with respect to the tire equatorial plane CL be set in the range of 50 to 80 deg, and in the present embodiment, the inclination angle with respect to the tire equatorial plane CL is set at 65 deg.

In addition, in the present embodiment, the end count for the reinforcement cord 11 in the first carcass ply 12 and the second carcass ply 14 is 11.6/cm.

(Radial Reinforcement Band Layer)

On the tire radius direction outside of the crown part of the semi-radial bias carcass 16, a radial reinforcement band layer 22 is disposed.

In the radial reinforcement band layer 22, a plurality of reinforcement cords 24 are arranged in parallel with one another and rubber-coated, respectively.

The reinforcement cord 24 in the radial reinforcement band layer 22 is preferably a textile cord having a relatively high elasticity; preferably has an elasticity higher than that for the reinforcement cord 11 in the semi-radial bias carcass 16; and preferably has an initial modulus of elasticity of 50 cN/dtex or over.

In case the reinforcement cord 24 is a textile cord, as the material therefor, aromatic polyamide (aramid), PEN, PET, rayon, and the like, can be mentioned, however, any other material may be used.

In the present embodiment, as the reinforcement cord 24, a rayon cord is used, and the initial modulus of elasticity therefor is 54 cN/dtex.

The inclination angle for the reinforcement cord 24 with respect to the tire equatorial plane CL is preferably 80 to 90 deg, and in the present embodiment, the inclination angle with respect to the tire equatorial plane CL is 90 deg.

In addition, in the present embodiment, the end count for the reinforcement cord 24 in the radial reinforcement band layer 22 is 10.6/cm.

(Belt Layer)

On the tire radius direction outside of the radial reinforcement band layer 22, a belt layer 26 is provided.

The belt layer 26 in the present embodiment is a so-called crossed belt layer constituted by two belt plies of a first belt ply 28 and a second belt ply 30, however, the belt layer 26 may be constituted by three or more belt plies.

In the first belt ply 28 and the second belt ply 30, a plurality of reinforcement cords 32 are arranged in parallel with one another and rubber-coated, respectively.

In the present embodiment, as the reinforcement cord 32, a textile cord is used, however, it may be a steel cord.

In case the reinforcement cord 32 is a textile cord, the initial modulus of elasticity therefor is preferably 150 cN/dtex or over. As the material for the textile cord, aromatic polyamide (aramid), PEN, PET, rayon, and the like, can be mentioned, however, any other appropriate material may be used.

The material for the reinforcement cord 32 in the present embodiment is aramid (Kevler (DuPont's trade name)), and the initial modulus of elasticity therefor is 195 cN/dtex.

Herein, assuming that the absolute value of the total sum of the rigidity components in the circumferential direction for the belt layer 26 is $|\Sigma Fb|$, and the absolute value of the total sum of the rigidity components in the width direction for the casing made up of the semi-radial bias carcass 16 and the radial reinforcement band layer 22 is $|\Sigma Fc|$, it is required that the equation $|\Sigma Fb|/|\Sigma Fc|=1.3$ to 3.0 be satisfied in case the reinforcement cord 32 is a textile cord as in the present embodiment, and the equation $|\Sigma Fb|/|\Sigma Fc|=0.03$ to 0.1 be satisfied in case the reinforcement cord 32 is a steel cord,
provided that $$|\Sigma Fb|=Mbi \times Nbi \times \cos(\alpha bi) \times \text{number of belt layers} \quad (i)$$

where

Mbi: The initial modulus of elasticity at 0.5% elongation for the reinforcement cord 32 constituting the belt layer 26 (the unit is cN/dtex for the textile cord, and is $kN/mm^2$ for the steel cord)

Nbi: The end count (number of cords/cm) for the reinforcement cord 32 constituting the belt layer 26

$\alpha bi$: The inclination angle (in deg) with respect to the circumferential direction for the reinforcement cord 32 constituting the belt layer 26 and $$|\Sigma Fc|=[Mpi \times Npi \times \sin(\alpha pi) \times \text{number of carcass plies}]+ [Msi \times Nsi \times \sin(\alpha si) \times \text{number of radial reinforcement band layers}]$$

where

Mpi: The initial modulus of elasticity (in cN/dtex) at 0.5% elongation for the reinforcement cord 11 constituting the carcass ply Msi: The initial modulus of elasticity (in cN/dtex) at 0.5% elongation for the reinforcement cord 24 constituting the radial reinforcement band layer 22

Npi: The end count (number of cords/cm) for the reinforcement cord 11 constituting the semi-radial bias carcass 16

Nsi: The end count (number of cords/cm) for the reinforcement cord 24 constituting the radial reinforcement band layer 22

αpi: The inclination angle (in deg) with respect to the circumferential direction for the reinforcement cord 11 constituting the semi-radial bias carcass 16

αsi: The inclination angle (in deg) with respect to the circumferential direction for the reinforcement cord 24 constituting the radial reinforcement band layer 22

In the present embodiment, the equation $|\Sigma Fb|/|\Sigma Fc|=2.0$ is satisfied.

On the tire radius direction outside of the belt layer 26, a tread rubber layer 34 is disposed.

Herein, the radial reinforcement band layer 22 is disposed only internally in the tire width direction than the tread end 34E.

The width WR of the radial reinforcement band layer 22 in the present embodiment is 100 mm, and is set at 80% of the tread periphery width WTP (the width measured along the tread surface from one tread end 34E to the other tread end 34E) (see FIG. 2).

(Operation)

Next, the operation of the pneumatic tire for two-wheeled vehicle 10 in the present embodiment will be described.

With the pneumatic tire for two-wheeled vehicle 10 in the present embodiment, the radial reinforcement band layer 22 in which the plurality of reinforcement cords 24 extending in the radial direction are arranged is disposed in the crown part of the semi-radial bias carcass 16, thus the section flexural rigidity (the flexural rigidity in the tire width direction) for the crown part is improved, and further the reinforcement cord 24 in the radial reinforcement band layer 22 restricts the pantograph made up of the reinforcement cords 11 of the first carcass ply 12 and the second carcass ply 14 from being extended in the radial direction, which provides a great reinforcement effect.

In addition, the radial reinforcement band layer 22 and the belt layer 26 are located at the center side than the tread end 34E, without getting to the side part, at the side part, only the semi-radial bias carcass 16 is provided, therefore, it assures the ride comfort while ensuring the necessary and minimum rigidity.

Therefore, with the ride comfort being assured, the braking performance and the high-speed turning performance can be improved.

Further, the radial reinforcement band layer 22, which enhances the section flexural rigidity, is not provided under the tread end part, thus the ground contactability at the time of banking is assured, which provides a high cornerability at the time of banking.

In the present embodiment, the reinforcement cord 11 in the semi-radial bias carcass 16 is specified to be a nylon cord, thus the strength per weight for it is high as compared to a rayon, which allows the rigidity requirement to be met with the smallest number of plies. In addition, the fatigue resistance required for the semi-radial bias carcass 16 is excellent.

In addition, in the present embodiment, the reinforcement cord 32 in the belt layer 26 is specified to be an aromatic polyamide cord, thus the strength per weight is double as high as that of a nylon, and the modulus of elasticity therefor is eight times as high, thus the belt layer 26 is optimum as a belt layer, which requires the effect of binding band most of all.

In addition, in the present embodiment, the reinforcement cord 24 in the radial reinforcement band layer 22 is specified to be a rayon cord, thus the modulus of elasticity is high, which provides the effect of suppressing the tire dimensional growth due to the running, and thus it is optimum as a reinforcing material.

In the present embodiment, the reinforcement cord 32 in the belt layer 26 is specified to be a textile cord (an aromatic polyamide cord), thus if the value of $|\Sigma Fb|/|\Sigma Fc|$, i.e., the ratio of the absolute value of the total sum of the rigidity components in the circumferential direction for the belt layer 26, $|\Sigma Fb|$, to the absolute value of the total sum of the rigidity components in the width direction for the casing made up of the semi-radial bias carcass 16 and the radial reinforcement band layer 22, $|\Sigma Fc|$, is lowered to be under 1.3, the ride comfort gets worse.

In addition, the reinforcement cord 32 in the belt layer 26 is a textile cord, thus if the value of the ratio $|\Sigma Fb|/|\Sigma Fc|$ exceeds 3.0, the ground contactability is impaired, resulting in the cornering characteristics being deteriorated.

If the initial modulus of elasticity, Mpi, for the reinforcement cord 11 in the semi-radial bias carcass 16 is under 29 cN/dtex, the rigidity and strength necessary for the tire cannot basically be maintained.

If the initial modulus of elasticity, Mpi, for the reinforcement cord 11 in the semi-radial bias carcass 16 exceeds 56 cN/dtex, the rigidity is excessively increased, resulting in the ride comfort getting worse.

If the inclination angle, αp, with respect to the circumferential direction for the reinforcement cord 11 in the semi-radial bias carcass 16 is under 50 deg, it becomes a bias construction.

If the inclination angle, αp, with respect to the circumferential direction for the reinforcement cord 11 in the semi-radial bias carcass 16 exceeds 80 deg, an insufficient effect of binding band will be given.

If the end count, Np, for the reinforcement cord 11 in the semi-radial bias carcass 16 is under 5/cm, the basic rigidity for the tire cannot be maintained.

If the end count, Np, for the reinforcement cord 11 in the semi-radial bias carcass 16 exceeds 13/cm, the rigidity is excessively increased, resulting in the ride comfort getting worse.

If the initial modulus of elasticity, Ms, for the reinforcement cord 24 in the radial reinforcement band layer 22 is under 50 cN/dtex, the rigidity necessary for the radial reinforcement band layer 22 cannot be provided.

If the inclination angle, αs, with respect to the circumferential direction for the reinforcement cord 24 in the radial reinforcement band layer 22 is under 80 deg, a difference between the right and left tires is produced, which affects the uniformity, and the like.

If the end count, Ns, for the reinforcement cord 24 in the radial reinforcement band layer 22 is under 8/cm, the rigidity necessary for the radial reinforcement band layer 22 cannot be provided.

If the end count, Ns, for the reinforcement cord 24 in the radial reinforcement band layer 22 exceeds 13/cm, both the ride comfort and the ground contactability get worse.

If the initial modulus of elasticity, Mb, for the reinforcement cord (the textile cord) 32 in the belt layer 26 is under 150 cN/dtex, it is not met as the belt layer 26 (geometry and effect of binding band cannot be maintained). (It is similar in a case in which the reinforcement cord 32 in the belt layer 26 is a steel cord, and if the initial modulus of elasticity, Mb, is under 8 kN/mm$^2$.)

If the inclination angle, αb, with respect to the circumferential direction for the reinforcement cord 32 in the belt layer 26 exceeds 30 deg, it is not met as the belt layer 26 (geometry and effect of binding band cannot be maintained).

If the end count, Nb, for the reinforcement cord 32 in the belt layer 26 is under 8/cm, it is not met as the belt layer 26 (geometry and effect of binding band cannot be maintained).

If the end count, Nb, for the reinforcement cord 32 in the belt layer 26 exceeds 13/cm, the ground contactability is diminished, resulting in the cornering characteristics being deteriorated.

If the width WR of the radial reinforcement band layer 22 exceeds 90% of the tread periphery width WTP, the section flexural rigidity is excessively increased, resulting in the tread ground contactability being too much lowered, and especially at the time of banking, the degradation in ground contactability may render it difficult to assure the cornering force and the cornering grip. If the radial reinforcement band layer 22 is laminated to the sidewall, the spring constant is too much increased, resulting in the ride comfort getting worse.

On the other hand, if the width WR of the radial reinforcement band layer 22 is lowered to be under 50% of the tread periphery width WTP, the effect of providing the radial reinforcement band layer 22 will be difficult to be obtained.

Second Embodiment

Next, a pneumatic tire for two-wheeled vehicle 40 pertaining to a second embodiment of the present invention will be described with reference to the drawings. The same components as given in the first embodiment will be provided with the same signs, with description thereof being omitted.

Figure 3:
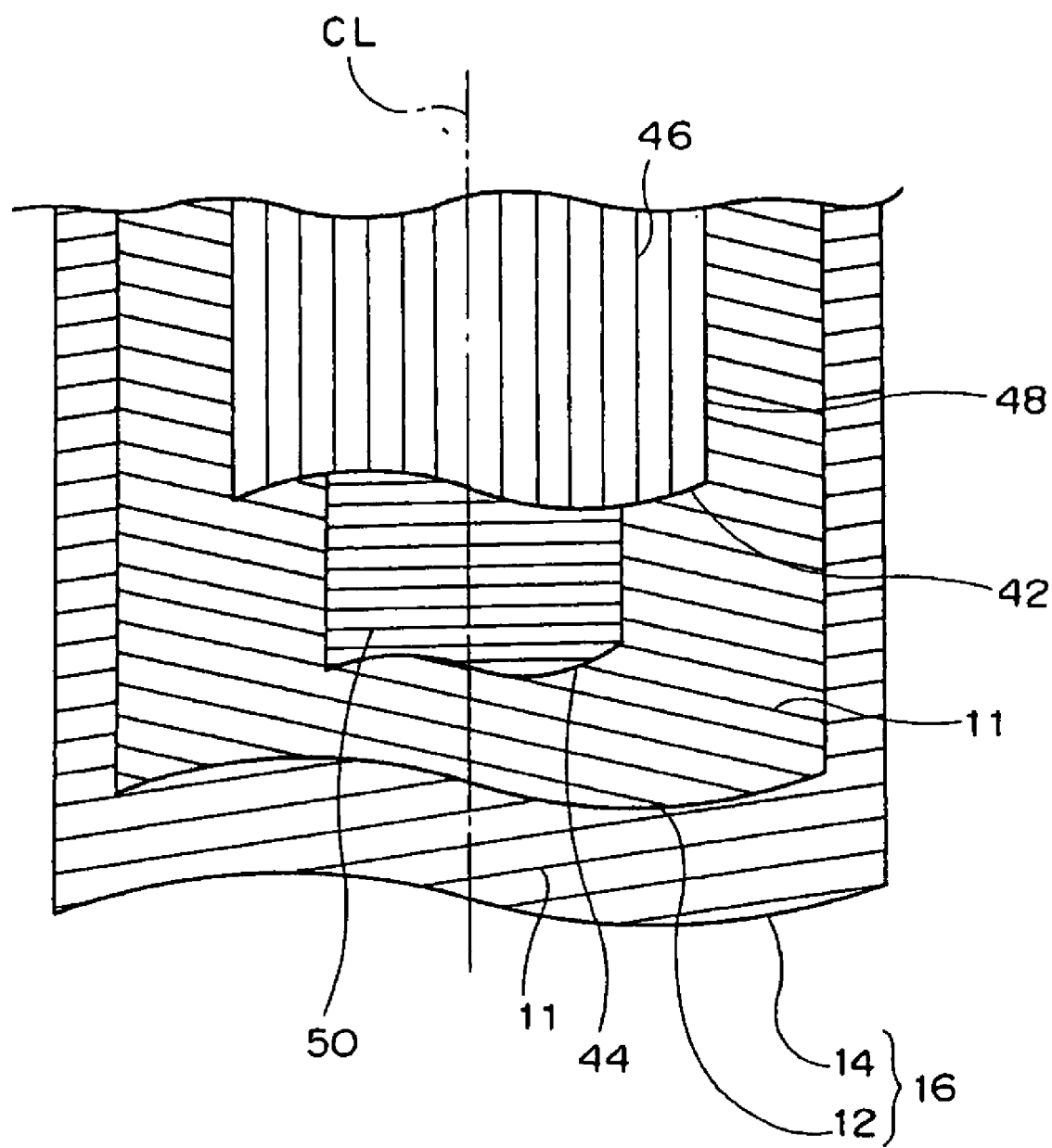
FIG. 3 is a plan development of the carcass layer, the radial reinforcement band layer, and the belt layer of a pneumatic tire for two-wheeled vehicle pertaining to a second embodiment.

The pneumatic tire for two-wheeled vehicle 40 of the present embodiment is for use with a front wheel which tire size is specified to be 120/70 R17, and as shown in FIG. 3, the construction of the semi-radial bias carcass 16 is the same as that in the first embodiment, but the constructions of a belt layer 42 and a radial reinforcement band layer 44 are different.

The belt layer 42 in the present embodiment is a so-called spiral belt, being made up of a single belt ply 48 which is constructed by spirally rolling up one reinforcement cord 46. The spiral belt may be constructed by spirally rolling up a plurality of reinforcement cords 46 which are arranged in parallel with one another in the shape of a ribbon.

As the reinforcement cord 46 in the present embodiment, a steel cord is used.

The initial modulus of elasticity for the steel cord used for the spiral belt is preferably 8 kN/mm$^2$ or over, and in the present embodiment, a steel cord having an initial modulus of elasticity of 9 kN/mm$^2$ is used.

The reinforcement cord 46, which is a steel cord, has the end count of 8/cm, and an inclination angle of 0 deg (smaller than 1 deg) with respect to the circumferential direction.

In addition, in the present embodiment, as a reinforcement cord 50 in the radial reinforcement band layer 44, an aromatic polyamide (aramid) cord having an initial modulus of elasticity of 195 cN/dtex is used.

The reinforcement cord 50 in the present embodiment has an inclination angle of 90 deg with respect to the circumferential direction, and the end count of 7.1/cm.

In addition, the width WR of the radial reinforcement band layer 44 in the present embodiment is 160 mm, being set at 80% of the tread periphery width WTP.

In the present embodiment, the ratio $|\Sigma Fb|/|\Sigma Fc|=0.03$ is satisfied.

(Operation)

Next, the operation of the pneumatic tire for two-wheeled vehicle 40 in the present embodiment will be described.

With the pneumatic tire for two-wheeled vehicle 40 in the present embodiment, the belt layer 42 is a so-called spiral belt, in which a steel cord extends along the tire circumferential direction, thus providing a great effect of binding band and an enhanced high-speed durability.

Further, the radial reinforcement band layer 44 is specified to be of a single layer, and the reinforcement cord 50 is to be an aromatic polyamide cord, which allows lightweighting the tire.

The other operation and effect are the same as those in the first embodiment.

In the present embodiment, the reinforcement cord 46 in the belt layer 42 is specified to be a steel cord, thus if the value of $|\Sigma Fb|/|\Sigma Fc|$, i.e., the ratio of the absolute value of the total sum of the rigidity components in the circumferential direction for the belt layer 42, $|\Sigma Fb|$, to the absolute value of the total sum of the rigidity components in the width direction for the casing made up of the semi-radial bias carcass 16 and the radial reinforcement band layer 44, $|\Sigma Fc|$, is lowered to be under 0.03, the chattering and the ride comfort, and the like, get worse.

In addition, the reinforcement cord 46 in the belt layer 42 is specified to be a steel cord, thus if the value of the ratio $|\Sigma Fb|/|\Sigma Fc|$ exceeds 0.1, the ground contactability is impaired, resulting in the grip and cornering characteristics being degraded.

TEST EXAMPLE

In order to verify the effects of the present invention, a pneumatic tire for two-wheeled vehicle as a prior art example, and a pneumatic tire for two-wheeled vehicle as an example applied in the present invention are prepared, and mounted on an automatic two-wheeled vehicle for comparison for high-speed turnability, feeling of rigidity at the time of braking, corner grip, handling, and ride comfort.

Example tire: A tire having a construction as described in the first embodiment.

Tire as prior art example: A tire which is the same as the example tire, but the radial reinforcement band layer is removed therefrom. The value of the ratio $|\Sigma Fb|/|\Sigma Fc|$ is 3.8.

The size of the rear tire is 190/640 R17, and the internal construction specified is the same as that of the front tire.

The evaluation is a feeling evaluation by a test rider, and is expressed as an index assuming that the prior art example be 100. The larger the numerical value of the index, the more excellent the performance it indicates.

TABLE 1

|  | Example | Prior art example |
| --- | --- | --- |
| High-speed turnability | 120 | 100 |
| Rigidity feeling at the time of braking | 120 | 100 |
| Corner grip | 110 | 100 |
| Handling | 110 | 100 |
| Ride comfort | 100 | 100 |

As a result of the test, it is demonstrated that the Example tire as an application of the present invention can maintain the ride comfort, and the ground contactability at the time of banking, have cornering force and grip, and greatly improve the rigidity, satisfying the requirements for both the braking performance, and the high-speed turning performance.

INDUSTRIAL APPLICABILITY

The present invention can be applied to two-wheeled vehicles for improvement of the braking performance, and the high-speed turning performance.

DESCRIPTION OF THE REFERENCE NUMERALS

10 Pneumatic tire for two-wheeled vehicle
11 Reinforcement cord
12 Carcass ply
14 Carcass ply
16 Semi-radial bias carcass (casing)
18 Bead part
20 Bead core
22 Radial reinforcement band layer (casing)
24 Reinforcement cord
26 Belt layer
28 First belt ply
30 Second belt ply
32 Reinforcement cord
40 Pneumatic tire for two-wheeled vehicle
42 Belt layer
44 Radial reinforcement band layer (casing)
46 Reinforcement cord
48 Belt ply
50 Reinforcement cord

What is claimed is:

1. A pneumatic tire for a two-wheeled vehicle, comprising:
bead cores embedded in a right and left pair of bead parts;
a semi-radial bias carcass layer which extends from one bead part to the other bead part in the shape of a toroid, end portions of which are rolled up around the bead cores to be latched at the bead cores;
a radial reinforcement band layer which is disposed only at an inner side of tread ends in a tire width direction, and is disposed at a tire radius direction outer side of a crown part of the semi-radial bias carcass layer, comprising at least one ply at which a plurality of reinforcement cords extending in a radial direction are arranged;
a belt layer which is disposed at an outer side of the radial reinforcement band layer in the tire radius direction, comprising at least one belt ply at which a plurality of reinforcement cords are arranged; and
a tread layer which is disposed at an outer side of the belt layer in the tire radius direction,
wherein,
in the semi-radial bias carcass layer, at least two carcass plies in which a plurality of reinforcement cords extending in a direction of 50 deg to 80 deg with respect to a tire equatorial plane are arranged are provided such that the reinforcement cords of the respective carcass plies are crossed with each other, and
assuming that the absolute value of the total sum of rigidity components in a circumferential direction of the belt layer is |ΣFb| and the absolute value of the total sum of rigidity components in a width direction of a case made up of the semi-radial bias carcass layer and the radial reinforcement band layer is |ΣFc|, |ΣFb|/|ΣFc|=1.3 to 3.0 in a case in which the reinforcement cord constituting the belt layer is a textile cord, and |ΣFb|/|ΣFc|=0.03 to 0.1 in a case in which the reinforcement cord constituting the belt layer is a steel cord,
provided that $$|\Sigma Fb| = Mbi \times Nbi \times \cos(\alpha bi) \times \text{number of belt layers} \quad (i)$$

where
Mbi: the initial modulus of elasticity at 0.5% elongation for the reinforcement cord constituting the respective belt layers (the unit is cN/dtex for the textile cord, and is kN/mm² for the steel cord)
Nbi: end count (cords/cm) for the reinforcement cord constituting the respective belt layers
αbi: inclination angle (deg) with respect to the circumferential direction for the reinforcement cord constituting the respective belt layers
and $$|\Sigma Fc| = [Mpi \times Npi \times \sin(\alpha pi) \times \text{number of the carcass plies}] + [Msi \times Nsi \times \sin(\alpha si) \times \text{number of the radial reinforcement band layers}]$$

where
Mpi: the initial modulus of elasticity (cN/dtex) at 0.5% elongation for the reinforcement cord constituting the carcass ply
Msi: the initial modulus of elasticity (cN/dtex) at 0.5% elongation for the reinforcement cord constituting the radial reinforcement band layer
Npi: end count (cords/cm) for the reinforcement cord constituting the carcass ply
Nsi: end count (cords/cm) for the reinforcement cord constituting the radial reinforcement band layer
αpi: inclination angle (deg) with respect to the circumferential direction for the reinforcement cord constituting the carcass ply
αsi: inclination angle (deg) with respect to the circumferential direction for the reinforcement cord constituting the radial reinforcement band layer.

2. The pneumatic tire for the two-wheeled vehicle of claim 1, wherein
the reinforcement cord in the carcass layer has the initial modulus of elasticity Mpi of 29 to 56 cN/dtex; the inclination angle αpi of 50 to 80 deg with respect to the circumferential direction; and the end count Npi of 5 to 13/cm,
the reinforcement cord in the radial reinforcement band layer has the initial modulus of elasticity Msi of 50 cN/dtex or more; the inclination angle αsi of 80 to 90 deg with respect to the circumferential direction; and the end count Nsi of 8 to 13/cm, and
the reinforcement cord in the belt layer is the textile cord having the initial modulus of elasticity Mbi of 150 cN/dtex or more, or the steel cord having the initial modulus of elasticity Mbi of 8 kN/mm² or more; and has the inclination angle αbi of 0 to 30 deg with respect to the circumferential direction; and the end count Nbi of 8 to 13/cm.

3. The pneumatic tire for the two-wheeled vehicle of claim 1, wherein the reinforcement cord in the radial reinforcement band layer has the elasticity higher than that for at least the reinforcement cord in the carcass layer.

4. The pneumatic tire for the two-wheeled vehicle of claim 1, wherein the width of the radial reinforcement band layer is 50 to 90% of a tread periphery width measured along a surface of the tread.

5. The pneumatic tire for the two-wheeled vehicle of claim 1, wherein
the reinforcement cord in the carcass layer is a nylon cord,
the reinforcement cord in the belt layer is an aromatic polyamide cord, and
the reinforcement cord in the radial reinforcement band layer is a rayon cord.

6. The pneumatic tire for the two-wheeled vehicle of claim 1, wherein
the reinforcement cord in the carcass layer is a nylon cord,
the reinforcement cord in the belt layer is a steel cord, and the belt layer is a spiral belt layer which is formed by spirally rolling up the steel cord, and
the radial reinforcement band layer is of a single layer, and the reinforcement cord is an aromatic polyamide cord.

* * * * *